H. EVANS.
SPRING ATTACHING MEANS FOR AUTOMOBILES.
APPLICATION FILED OCT. 14, 1916.
1,222,087.
Patented Apr. 10, 1917.
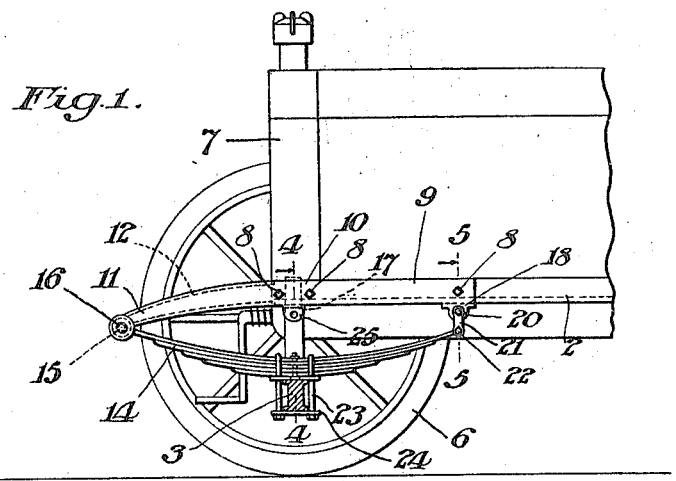
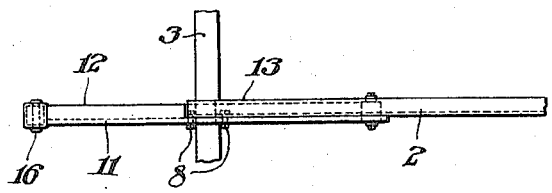
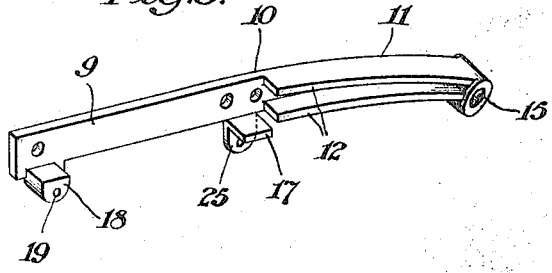
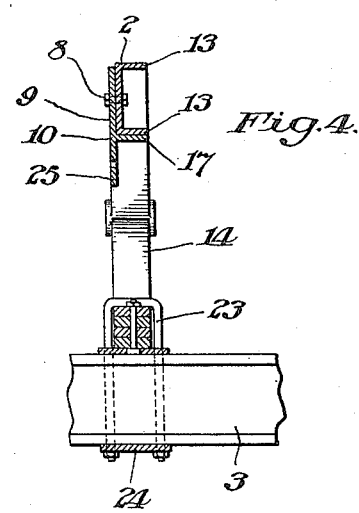
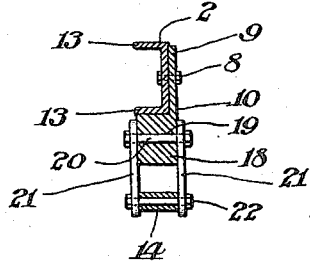
Inventor:
Harry Evans,
By
Attorney.

UNITED STATES PATENT OFFICE.

HARRY EVANS, OF BRYN MAWR, PENNSYLVANIA.

SPRING-ATTACHING MEANS FOR AUTOMOBILES.

1,222,087.

Specification of Letters Patent.

Patented Apr. 10, 1917.

Application filed October 14, 1916. Serial No. 125,542.

*To all whom it may concern:*

Be it known that I, HARRY EVANS, a citizen of the United States, residing at Bryn Mawr, in the county of Montgomery and State of Pennsylvania, have invented certain new and useful Improvements in Spring-Attaching Means for Automobiles, of which the following is a specification.

My invention relates to improvements in means for attaching springs to the frames of automobiles of the "Ford" type.

The object of my invention is to provide a novel, simple and efficient means for attaching a leaf spring to the side bar of an automobile frame in such position that it shall lie beneath and extend longitudinally of or in the same general direction with the bar; and to this end the invention, as generally stated, consists in the provision of a novel and improved bracket adapted to be applied to the side bar and to extend forwardly from the forward end thereof and being provided with means for attaching a spring thereto. The invention also includes various novel features of construction and combinations of parts hereinafter fully described and claimed.

In the accompanying drawings illustrating my invention:

Figure 1 is a side view, partly in section, of an automobile of the "Ford" type provided with a spring attaching means embodying my invention.

Fig. 2 is a top view of said means and adjuncts.

Fig. 3 is a perspective view of the bracket detached from the frame bar.

Fig. 4 is a section on line 4—4 of Fig. 1.

Fig. 5 is a section on line 5—5 of Fig. 1.

Referring to the drawings, 2 designates one of the side bars of the frame, 3 the forward axle and 6 the forward carrying wheels of an automobile of the "Ford" type, in which the forward ends of the side bars 2 are straight and horizontal and terminate at or near the radiator 7.

Arranged against the outer face of the forward end of the side bar 2 and secured thereto, by means of transverse bolts 8, is the horizontally extending rearward portion 9 of my improved bracket 10.

The forward end portion 11 of the bracket 10 extends forwardly and downwardly from the forward end of the side bar 2 and forms, in effect, a continuation thereof, the portion 11 having ribs or flanges 12 extending laterally and inwardly from the upper and lower edges thereof and abutting against the forward ends of similar flanges 13 forming a part of the channel shaped side bar 2.

The forward end of the forward portion 11 of the bracket 10 is open to receive the forward end of a leaf spring 14 and it is provided with a transverse hole or opening 15 for the reception of a bolt or rivet 16, which extends through the opening 15 and through the spring 14 and forms a means for attaching the forward end of the spring 14 to the bracket 10.

The horizontal portion 9 of the bracket 10 is provided with parts or lugs 17 and 18 which extend laterally therefrom beneath the frame bar 2 and which are engaged with the bottom of the frame bar to support it.

The part or lug 18 extends downwardly and is horizontally perforated, at 19, for the reception of a bolt or rivet 20 which extends through the opening 19 and through the upper ends of a pair of links 21 and pivotally connects them to the lug 18. The lower ends of the links 21 are pivotally connected to the rearward end of the spring 14 by a bolt or rivet 22 which extends therethrough. Thus the links 21 and bolts 20 and 22 form a suitable means for attaching the rearward end of the spring 14 to the bracket 10 or to the side bar 2, the bracket 10 being secured to the side bar 2 and forming in effect, a part thereof.

The central portion of the spring 14 rests upon and is secured to the axle 3 by U-bolts 23 and a bottom plate 24, as clearly shown in the drawings.

The central portion of the bracket 10 is provided with a downwardly-extending, perforated lug 25 to which the fender or mud guard for the adjacent wheel 6 may be secured.

I claim:

1. A bracket comprising a horizontally extending rearward portion adapted to be secured to the side of the forward end of a side bar of an automobile frame, a downwardly extending forward portion, a laterally extending part adapted to engage the forward end of the side bar of an automobile frame and a laterally extending part adapted to engage the bottom of the side bar of an automobile frame.

2. The combination of a side bar of an automobile frame, a bracket secured to the bar and having its forward end portion extending forwardly and downwardly from the forward end of the bar and having its rearward portion provided with a plurality of laterally extending parts engaging the bottom of the bar and abutting against the forward end of the bar, and a leaf spring extending beneath the bar and having its rearward end connected to one of said laterally extending parts which engages the bottom of the bar and having its forward end attached to the forward end of the bracket.

In testimony whereof I affix my signature hereto.

HARRY EVANS.

Copies of this patent may be obtained for five cents each, by addressing the "Commissioner of Patents, Washington, D. C."